June 17, 1930.  F. P. PRINDLE  1,765,356
SCRAP BUNDLING MACHINE
Filed Oct. 27, 1927  2 Sheets-Sheet 1

Inventor
Frank P. Prindle
By T. Clay Lindsey
His Attorney

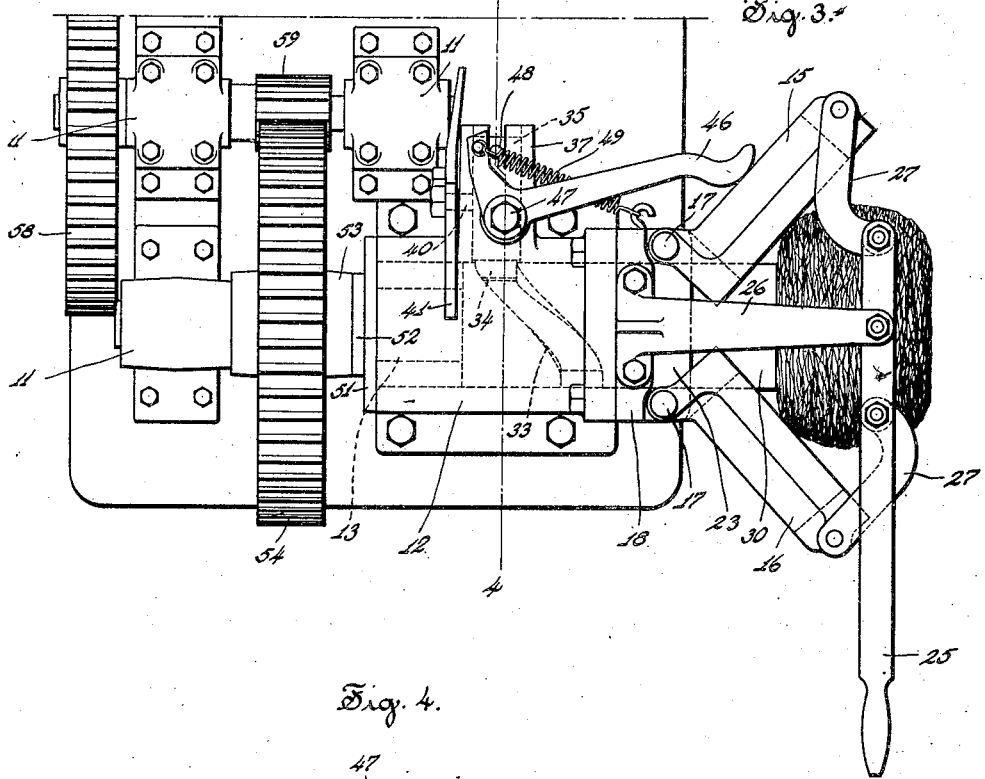
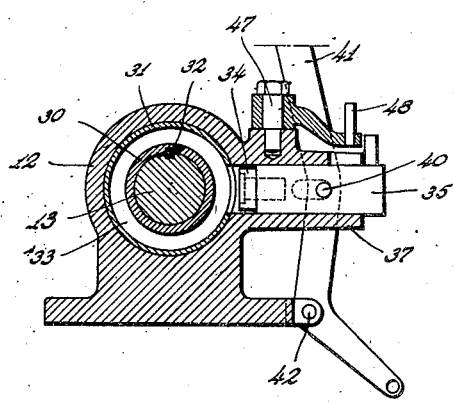

Patented June 17, 1930

1,765,356

UNITED STATES PATENT OFFICE

FRANK P. PRINDLE, OF NEW BRITAIN, CONNECTICUT, ASSIGNOR TO THE STANLEY WORKS, OF NEW BRITAIN, CONNECTICUT, A CORPORATION OF CONNECTICUT

SCRAP-BUNDLING MACHINE

Application filed October 27, 1927. Serial No. 229,165.

This invention relates to machines for bundling or balling scrap of the type having a mandrel or arbor on which the scrap is wound and a yoke or former surrounding the arbor for shaping and compacting the ball or mass of scrap wound upon the mandrel. Machines of this type are disclosed in the patents to D. B. Marwick, Nos. 851,179 and 1,170,983, respectively patented April 23, 1907, and February 8, 1916.

The aim of the invention is to provide a machine of this type with certain improvements which prolong and increase the life and productivity of the machine.

More particularly, an aim of the invention is to provide, in a machine of this sort, improved, simple, effective and durable mechanism by means of which the bundle or ball wrapped upon the mandrel or arbor may be readily and quickly freed or loosened therefrom.

A further object of the invention is to so construct and arrange a machine of this sort that the wearing action of the scrap being bundled or balled is greatly reduced, which means that the machine has greater productivity as it is unnecessary to lay it up at frequent intervals for repairs and renewal of parts.

Other objects will be in part obvious and in part pointed out more in detail hereinafter.

The invention accordingly consists in the features of construction, combination of elements and arrangement of parts which will be exemplified in the construction hereinafter set forth and the scope of the application of which will be indicated in the appended claims.

In the accompanying drawings, wherein is shown, for illustrative purposes, one of the many embodiments which the present invention may take:

Fig. 3 is a top plan view of the machine with a portion of the driving mechanism omitted; and Fig. 4 is a detail view taken substantially on line 4—4 of Fig. 3.

Figure 1:
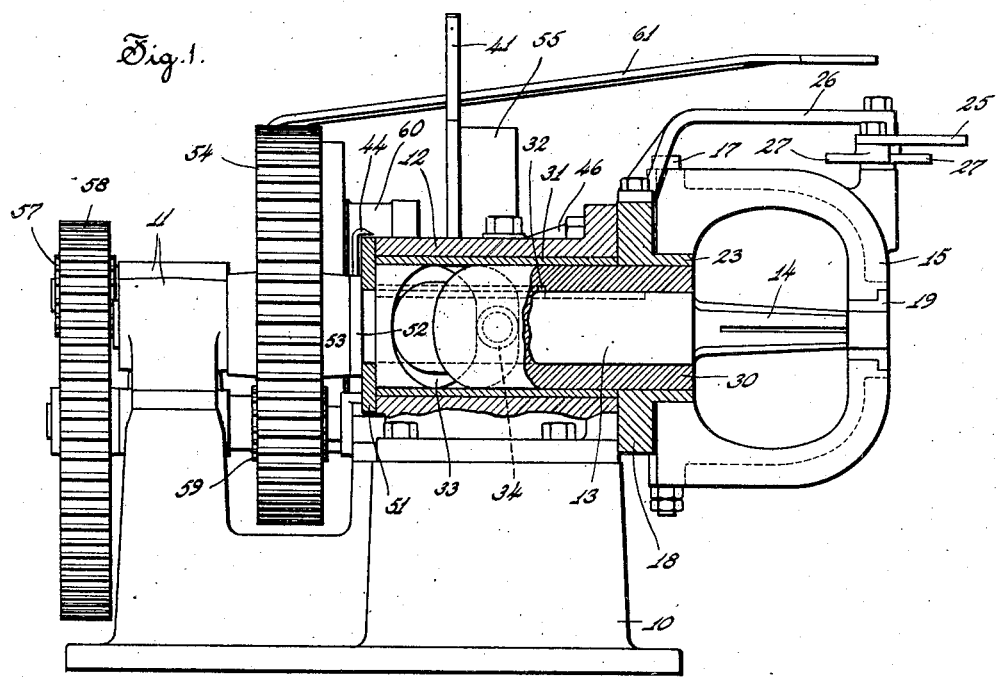
Figure 1 is a side view of the machine with the parts supporting the mandrel shown partially in longitudinal vertical section.

Referring to the drawings in detail, the machine has a frame or base 10 which may be of any suitable construction, that shown in the drawings being by way of illustration only. The frame is provided with suitable bearings 11 for supporting the shafts of the driving mechanism. It further has a bearing 12 within which is mounted a spindle 13 having an arbor or mandrel 14 on which the scrap is wound. The numerals 15 and 16 designate the sections of the yoke or former which, when the machine is in operation, surround the arbor 14 and determine the shape of the ball or bundle of scrap formed on the mandrel.

Figure 2:
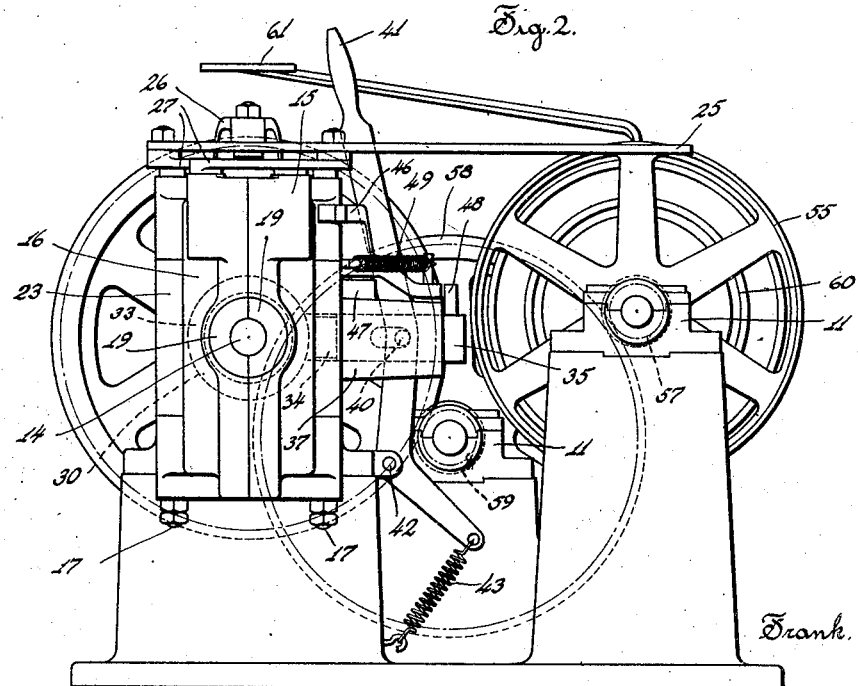
Fig. 2 is a view looking at the front of the machine.

The sections 15 and 16 which are complementary to one another are pivoted by means of bolts 17 to a casting or flange plate 18 secured to the forward end of the bearing 12. Each of the sections is generally in the form of a C, and the bolts 17, in addition to forming pivots, tie the arms of the respective sections together so that they will not spring apart when pressure is exerted thereon by the scrap being wound. The outer or free ends of the sections have complementary semi-cylindrical bearing members 19 in which the outer end of the mandrel is adapted to rotatably fit when the former is in the closed condition shown in Fig. 2. The plate 18 has, on its outer face, a transverse rib 23 which is adapted to engage in the space between the inner ends of the arms of the former sections. The former may be opened and closed in any suitable manner, in the present instance there being shown for this purpose a manually operable lever 25 pivoted to an arm 26 extending from the plate 18, and links 27 between the lever and the respective sections.

In accordance with the present invention, improved means is provided for freeing or loosening the ball or bundle of scrap wound onto the mandrel. This means, in the present illustrative disclosure, includes a sleeve 30 rotatable with, and movable longitudinally of, the spindle 13. The sleeve 30 rotates in a lining 31 within the bearing 12 and extends into the plate 18. The forward end of the sleeve, when in the retracted position shown in Fig. 1, is preferably flush with the forward end of the rib 23 and the edge of the opening through the former, so that this opening is substantially continuous and is devoid of shoulders on which the scrap being wound would likely catch. In order that the sleeve may be rotated with, and by moved longitudinally of, the spindle, it is splined to the latter by a key 32.

Preferably, the power of the machine is employed for moving the sleeve or plunger 30 in a direction to free the bundle from the arbor and, to this end, the sleeve has a barrel cam or groove 33 in which is adapted to be engaged at will a roller 34 carried by a reciprocating element 35 slidably mounted in a tubular extension 37 projecting laterally from the bearing 12. By preference, the element 35 and the opening in which it slides are non-circular. For example, they may be square in cross section in order to prevent rotation of the element 35. The cam groove 33 is arranged so that, upon one rotation of the sleeve 30 while the roller 34 is engaging in this groove, the sleeve 30 will be moved through one cycle, that is, advanced to the position shown in Fig. 3 and then retracted to the position shown in Fig. 1. This cam groove also has a dwell portion which is provided for the purpose of permitting ready engagement of the actuating roller 34 in the cam groove. In order to engage the roller carried by the element 30 in the cam groove, this element has a pin 40 connected to a hand lever 41 pivoted as at 42. This lever is normally urged by a spring 43 in a direction to withdraw the roller from the cam groove when the lever 41 is released. For the purpose of determining when the dwell portion of the cam groove is opposite the roller 34, the shaft or spindle 13 may have an indicating pointer 44.

In the event that the roller was engaged in the cam groove before the former was opened, as shown in Fig. 3, parts of the machine would be damaged or broken and, in order to prevent this, there is provided means controlled by the former for preventing engagement of the roller with the cam while the former is closed. In the present instance, this means includes the crank lever 46 pivoted as at 47 and having one end or arm adapted to lie in the path of movement of the section 15 of the former. The other arm of this lever, when the former is closed, is adapted to engage in front of a stud 48 projecting upwardly from the roller carrying element 35. The lever is normally urged by a spring 49 in a direction to engage the latter end of the lever in front of the stud 48.

It will be observed that the spindle 13 is held against longitudinal movement by means of a thrust bearing located at the rear end of the bearing 12. This thrust bearing is in the form of a washer 51 against which is adapted to engage a collar 52 on the spindle. The collar is interposed between this washer 51 and the hub 53 of a gear 54. This gear may be driven in any suitable manner as, for instance, from a pulley 55 acting through pinion 57, gear 58 and pinion 59. Obviously, the spindle 13 may be driven in any suitable manner. There may be associated with the pulley 56 a clutch 60 controlled by a handle or lever 61, the clutch being diagrammatically or conventionally shown, as the particular construction thereof forms no part of the present invention.

The operation of the machine is briefly as follows: During the winding or bundling operation, the former is in the closed position shown in Figs. 1 and 2, the sleeve 30 is in the retracted position shown in Fig. 1, and the roller 34 is disengaged from the sleeve as shown in Fig. 4. The scrap is fed to the rotating arbor upon which it is wound and the former determines the shape of the bundle and compacts the same. Obviously, the interior edges of the former sections may be lined or faced with suitable hardened elements in order to resist excessive wear. When a bundle of the proper size has been formed, the operator will stop the machine with the dwell portion of the cam 33 in alignment with the roller 34, and he can determine this position by observing the indicator 44. The operator will now open the former by moving the lever 25 to the position shown in Fig. 3 and, until he does this, he cannot engage the roller in the cam groove because the rear arm of the lever 46 is in front of the stud 48. Upon opening the former, however, the section 15 throws the lever 46 to the position shown in Fig. 3, thus freeing the stud 48. The operator will now move the handle 41 to the left, referring to Fig. 2, so as to engage the roller in the cam groove, as shown in Fig. 3. The power is then thrown onto the machine, whereupon the sleeve 30 is rotated and, due to the roller 34, the sleeve will be advanced to the position shown in Fig. 3 so as to free and loosen the bundle from the arbor. The extent of movement of the sleeve is sufficient to advance the bundle to a point where it may be easily pulled from the end of the mandrel. The lever 41 is now released, whereupon the spring 43 will move it in a direction to disengage the roller from the cam groove, and the former is closed preparatory to forming a new bundle or ball on the arbor. In the event that the sleeve is not withdrawn to the normal position shown in Fig. 1, it will be forced to this position by the scrap as it is being wound upon the arbor.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. A machine for bundling scrap including a rotary spindle having an arbor, a bundle former about said arbor comprising two sections pivoted for lateral movements, and means independent of said former and rotatable with and movable longitudinally of said spindle for freeing the bundle therefrom when said former is opened.

2. A machine for bundling scrap including a bearing member, a sleeve mounted therein for rotary and longitudinal movements, a spindle fixed against longitudinal movement and fixed to said sleeve so as to rotate therewith, a thrust bearing at the rear end of said bearing member, and a former supported on the forward end of said bearing member and surrounding said arbor.

3. A machine for bundling scrap including a support, a sleeve journalled in said support for longitudinal movement, a spindle in said sleeve fixed thereto to rotate therewith and fixed against longitudinal movement, and a former comprising a pair of sections pivoted to the forward end of said support, the forward ends of said support and sleeve being flush with the interior periphery of the former when the latter is in closed position.

4. A machine for bundling scrap including a rotary spindle having an arbor, a former about said arbor and fixed against longitudinal movement relative thereto, a member movable longitudinally of the spindle for freeing the bundle formed thereon, power means for rotating said spindle, and means for causing said power means to operate said member.

5. A machine for bundling scrap including a rotary spindle having an arbor, a former about said arbor, a rotatable member movable longitudinally of said spindle for freeing the bundle from the arbor, and cam means for moving said member.

6. A machine for bundling scrap including a rotary spindle having an arbor, a former about said arbor, a rotatable sleeve about said spindle and movable longitudinally thereof, said sleeve having a cam groove, and a member engageable in said grove for causing said sleeve to move longitudinally.

7. A machine for bundling scrap including a rotary spindle having an arbor, a sectional former about said arbor, a sleeve about said spindle fixed thereto to rotate therewith and movable longitudinally thereof, said sleeve having a cam groove, a member engageable in said groove, and means for engaging and disengaging said member in said cam groove.

8. A machine for bundling scrap including a rotary spindle having an arbor, a sectional former about said arbor, a sleeve about said spindle fixed thereto to rotate therewith and movable longitudinally thereof, said sleeve having a cam groove, a member engageable in said groove, and means for engaging and disengaging said member in said cam groove, said groove having a dwell portion to facilitate the engagement of said member therein, and said spindle having an indicator for indicating the position of said dwell portion.

9. A machine for bundling scrap including a support, a sleeve journalled therein for longitudinal movement and having a cam groove, a spindle having an arbor and fixed against longitudinal movement in and connected to so as to rotate said sleeve, a former about said arbor, a transversely movable member carried by said support, a roller on said member adapted to engage in said groove, and a lever for operating said member.

10. A machine for bundling scrap including a rotary arbor, a former about said arbor and comprising a plurality of sections adapted to be moved apart to permit removal of the bundle from the arbor, means separate from and movable relative to said former for freeing the bundle from the arbor, and means controlled by said former for preventing actuation of said bundle freeing means when the former is closed.

11. A machine for bundling scrap including a rotary spindle having an arbor, a former about said arbor comprising a plurality of sections adapted to be moved to closed and open positions, a sleeve about said spindle and mounted for longitudinal movement to free the bundle from the arbor, means for moving said sleeve, and means interposed between said last mentioned means and said former for preventing actuation of said last mentioned means when the former is closed.

12. A machine for bundling scrap including a rotary spindle having an arbor, a former about said arbor and comprising a pair of sections pivoted for swinging lateral movement into and out of closed position, a sleeve fixed to rotate with and movable longitudinally of said spindle and having a cam groove, a member engageable in said groove, a lever for moving said member, and a lever for preventing actuation of said first mentioned lever when the former is closed, said second mentioned lever being moved by the former when the latter is open to a position where said first mentioned lever may be actuated.

13. A machine for bundling scrap including a rotary arbor fixed against longitudinal movement, a bundle former extending longitudinally of and surrounding said arbor and defining an opening in which the bundle is formed, and means independent of said former and movable longitudinally of said arbor for freeing the bundle formed thereon said means during the bundle forming operation being outside of said opening.

14. A machine for bundling scrap including a rotary arbor fixed against longitudinal movement, a bundle former comprising a pair of sections pivoted for lateral swinging movement towards and away from each other and adapted to completely encircle the bundle during the formation thereof, and means independent of said former and movable longitudinally of said arbor for freeing the bundle formed thereon said means being located outside of the opening defined by said former during the bundle forming operation.

15. A machine for bundling scrap including a rotary arbor, a former about and fixed against longitudinal movement relative to said arbor, and means independent of said former and rotatable with and movable longitudinally of said arbor for freeing the bundle formed thereon.

16. A machine for bundling scrap including a rotary spindle having an arbor, a former about said arbor and fixed against longitudinal movement, a sleeve about said spindle and fixed to said spindle so as to rotate therewith, said sleeve being movable longitudinally of said arbor and former to free the bundle from the arbor, and means for moving said sleeve.

17. A machine for bundling scrap including a bearing member, a sleeve mounted therein for rotary and longitudinal movements, a spindle fixed against longitudinal movement and extending through and fixed to said sleeve so as to rotate therewith, a former supported on the forward end of said bearing member and surrounding said arbor, and means for longitudinally moving said sleeve to free the bundle from said arbor.

18. A machine for bundling scrap including a rotary spindle having an arbor, a former about said arbor and having an opening through which said spindle extends, said former comprising a plurality of hinged sections, a sleeve about said spindle and adapted to be projected through said opening, said sleeve being keyed to said spindle for longitudinal movement relative thereto and for rotary movement therewith, and means for moving said sleeve.

19. A machine for bundling scrap including a frame, a sleeve supported therein for longitudinal movement, a spindle fixed against longitudinal movement and extending through said sleeve, said sleeve constituting a support for said spindle, said spindle having an arbor at one end, a former supported on said frame and surrounding said arbor, and means for moving said sleeve.

FRANK P. PRINDLE.